(12) United States Patent
Hinz

(10) Patent No.: US 9,981,374 B2
(45) Date of Patent: May 29, 2018

(54) MARKING JIG FOR LOCATING MOUNTING HOLES FOR HANDLES AND PULLS

(71) Applicant: Krystian Hinz, Robbinsville, NJ (US)

(72) Inventor: Krystian Hinz, Robbinsville, NJ (US)

( * ) Notice: Subject to any disclaimer, the term of this patent is extended or adjusted under 35 U.S.C. 154(b) by 132 days.

(21) Appl. No.: 15/179,943

(22) Filed: Jun. 10, 2016

(65) Prior Publication Data

US 2017/0355074 A1    Dec. 14, 2017

(51) Int. Cl.
| | | |
|---|---|---|
| *B25H 7/00* | (2006.01) | |
| *E04F 21/04* | (2006.01) | |
| *G01B 3/00* | (2006.01) | |
| *A47B 95/02* | (2006.01) | |
| *E04F 21/00* | (2006.01) | |

(52) U.S. Cl.
CPC ............... *B25H 7/00* (2013.01); *A47B 95/02* (2013.01); *E04F 21/003* (2013.01); *G01B 3/002* (2013.01); *A47B 2095/024* (2013.01)

(58) Field of Classification Search
CPC .................................. B25H 7/00; E04F 21/003
USPC .......................................................... 33/667
See application file for complete search history.

(56) References Cited

U.S. PATENT DOCUMENTS

| | | | | |
|---|---|---|---|---|
| 697,090 A | * | 4/1902 | Keef ..................... | E04F 21/003 33/194 |
| 788,802 A | | 5/1905 | Vreeland | |
| 990,502 A | | 4/1911 | Richardson | |
| 1,135,259 A | * | 4/1915 | Cokely ..................... | B25H 7/00 33/42 |
| 2,647,325 A | | 8/1953 | Little | |
| 2,651,951 A | * | 9/1953 | Altenburger ............ | B23B 47/28 33/563 |
| 2,698,999 A | * | 1/1955 | McCollum ............... | B25H 7/00 33/428 |
| 2,807,095 A | * | 9/1957 | Maxwell ................. | E05B 17/06 33/450 |
| 2,842,860 A | | 7/1958 | Gray | |
| 2,949,798 A | * | 8/1960 | Berta, Jr. .............. | E04F 21/003 33/563 |
| 3,039,199 A | | 6/1962 | Maag | |
| 3,246,399 A | | 4/1966 | Southern | |
| 3,583,823 A | | 6/1971 | Eaton et al. | |

(Continued)

FOREIGN PATENT DOCUMENTS

| | | | | |
|---|---|---|---|---|
| CA | 2768950 A1 | * | 8/2013 | .............. B43L 13/20 |
| GB | 2507973 A | * | 5/2014 | ............... A47H 7/00 |

*Primary Examiner* — Christopher Fulton
(74) *Attorney, Agent, or Firm* — LaMorte & Associates, P.C.

(57) ABSTRACT

A jig assembly for marking a cabinet with hole positions that are needed to install hardware. The jig assembly utilizes a reference plate. At least one matrix of holes is formed through the reference plate. The holes are used to make markings at different positions and distances. The holes are preferably identified with scale indicia that provide visual indications as to the positions of each of the holes. Arms are attached to the reference plate with pivot connections. Marking holes are disposed through the arms. The arms can rotate and extend from the reference plate in opposite directions. A top plate is positioned across the top edge of the reference plate. The top plate creates a guide. A side plate is positioned across a side edge of the reference plate. The side plate creates a second guide that intersects the top plate at a perpendicular.

19 Claims, 6 Drawing Sheets

(56) References Cited

U.S. PATENT DOCUMENTS

| | | | |
|---|---|---|---|
| 4,257,166 A | | 3/1981 | Barker et al. |
| 4,610,092 A | * | 9/1986 | Hafele .................. B23B 47/287 33/613 |
| 4,952,101 A | * | 8/1990 | Coombs ................ B23B 47/287 33/667 |
| 4,981,400 A | | 1/1991 | Stover |
| 4,998,355 A | * | 3/1991 | Greene .................... B25H 7/00 33/194 |
| 5,807,036 A | * | 9/1998 | Lostlen ................ B23B 47/287 408/115 R |
| 5,813,803 A | | 9/1998 | Sommerfeld |
| 5,940,979 A | | 8/1999 | Ericksen et al. |
| 6,158,137 A | | 12/2000 | Bramlett |
| 6,314,656 B1 | | 11/2001 | Morel et al. |
| 6,804,891 B1 | | 10/2004 | Hurtgam |
| 7,189,035 B2 | | 3/2007 | Miro |
| 7,406,776 B2 | | 8/2008 | Brumbaugh |
| 8,312,634 B1 | * | 11/2012 | Forsyth ................... B25H 7/02 33/1 B |
| 2007/0101598 A1 | * | 5/2007 | Miro .................... B23B 47/287 33/667 |
| 2008/0078094 A1 | * | 4/2008 | Baumann ................ B43L 7/005 33/566 |

\* cited by examiner

MARKING JIG FOR LOCATING MOUNTING HOLES FOR HANDLES AND PULLS

BACKGROUND OF THE INVENTION

1. Field of the Invention

In general, the present invention relates to jigs and templates that assist a person in mounting a pull or handle to a drawer or door. More particularly, the present invention relates to jigs and templates with extendable arms that enable the jig or template to be adjusted to the requirements of a variety of handles and pulls.

2. Prior Art Description

Most homes have kitchens with built-in cabinetry. The cabinets have doors and drawers. Typically, the doors have handles and the drawers have pulls. Such hardware facilitates the easy opening and closing of the doors or drawers. The hardware of the handles and pulls are typically mounted to the cabinet doors and drawers by drilling holes through a door or the face of the drawer. The hardware of the handle or pull is then set in place by passing mounting bolts through the holes and engaging the handle or pull from behind.

The hardware of the handles and pulls is often selected separately from the cabinets. As such, the selected hardware must be custom installed onto the cabinets after the cabinets are mounted in place. Since the mounting of a handle or pull requires the drilling of holes through the material of the cabinets, great care is taken to drill the holes in the proper locations. If a mounting hole is drilled in a wrong position, the door or drawer would require extensive repair and may have to be replaced. This can add significantly to the cost of the overall project.

Drilling the proper holes in the proper location of a door or drawer is complicated. Within the same set of cabinets, there are typically doors and drawers of different sizes. Likewise, a person may want to use different handles and pulls on different doors and drawers. As such, each door and drawer must be exactly measured and marked to ensure that the mounting holes being drilled are both in the proper location and are for the proper model handle or pull.

In the prior art, there are many jigs and templates that help a person mark a door or drawer for the proper location to place mounting holes. However, many of these jigs and templates are designed only to install a handle or pull on the center of a drawer. Such prior art jigs and templates are exemplified by U.S. Pat. No. 990,502 to Richardson and U.S. Pat. No. 3,039,199 to Maag. Since these jigs and templates take measurements from the center point of a drawer, they are not particularly useful is mounting a handle to a door in an offset position.

In the prior art, if a handle is being mounted to a door in an off-set position that is closer to one corner than another, then the jig or template must reference itself from the side edge of the door, rather than the center of the door. Such prior art jigs and templates are exemplified by U.S. Pat. No. 3,246,399 to Southern.

Accordingly, if a person is installing offset handles on cabinet doors and central pulls on drawers, two different jigs, or templates must be used. Another problem occurs in that prior art jigs and templates typically lock into one configuration for one type of handle or one type of pull. If a project has different handles and pulls, the templates and jigs must be readjusted. This is difficult to do in many prior art designs. As such, the amount of time the project takes is prolonged by the time it takes to repeatedly readjust various templates and jigs.

A need therefore exists for an improved jig that can be used to position both centralized pulls and off-center handles, wherein the jig can be adjusted easily and quickly to different applications. This need is met by the present invention as described and claimed below.

SUMMARY OF THE INVENTION

The present invention is a jig assembly for marking a cabinet with hole positions that are needed to install hardware, such as door handles or drawer pulls. The jig assembly utilizes a reference plate. The reference plate has a face surface and an opposite rear surface. The face surface and the rear surface are defined along the periphery, at least in part, by a top edge, a bottom edge and side edges.

At least one matrix of holes is formed through the reference plate. The holes are used to make markings at different positions and distances. The holes are preferably identified with scale indicia that provide visual indications as to the positions of each of the holes.

Arms are attached to the reference plate with pivot connections. A first arm is pivotably connected to the reference plate a first distance from the top edge of the reference plate. A first plurality of holes is disposed through the first arm. A second arm is pivotably connected to the reference plate, wherein a second plurality of holes is disposed through the second arm. The first arm and the second arm can rotate and extend from the reference plate in opposite directions. A third arm is pivotably connected to the reference plate. The third arm can extend from the reference plate in a direction perpendicular to that of the first and second arm.

A top plate is positioned across the top edge of the reference plate. The top plate creates a guide along the top edge of the reference plate. A side plate is positioned across a side edge of the reference plate. The side plate creates a guide along only one face of the reference plate that intersects the top plate at a perpendicular.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention jig assembly can be embodied in many ways, only one exemplary embodiment of the jig assembly is used for illustration and description. This embodiment is selected in order to set forth one of the best modes contemplated for the invention. The illustrated embodiment, however, is merely exemplary and should not be considered a limitation when interpreting the scope of the appended claims.

Figure 1:
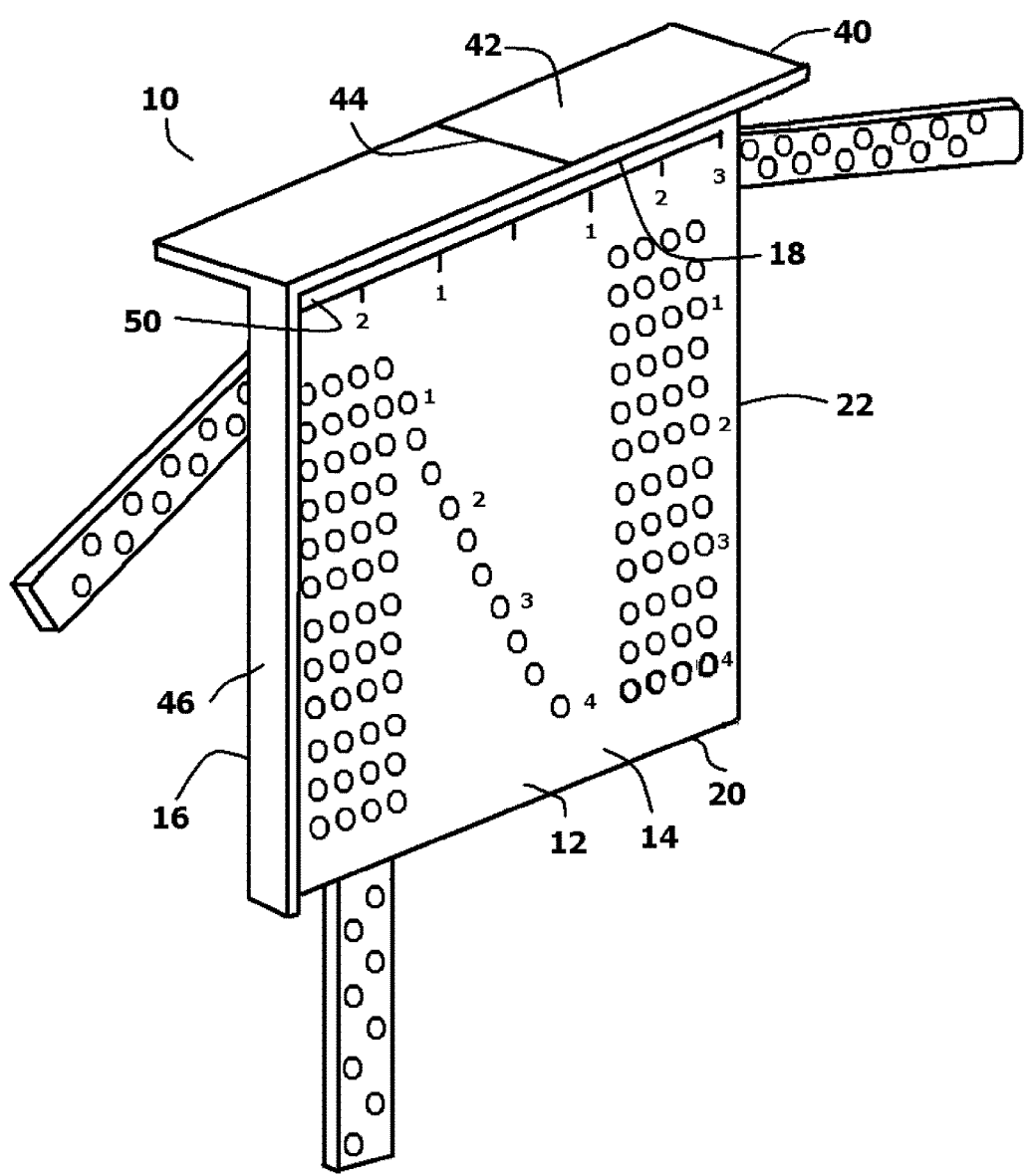
FIG. 1 is a front perspective view of an exemplary embodiment of a jig assembly.
Figure 2:
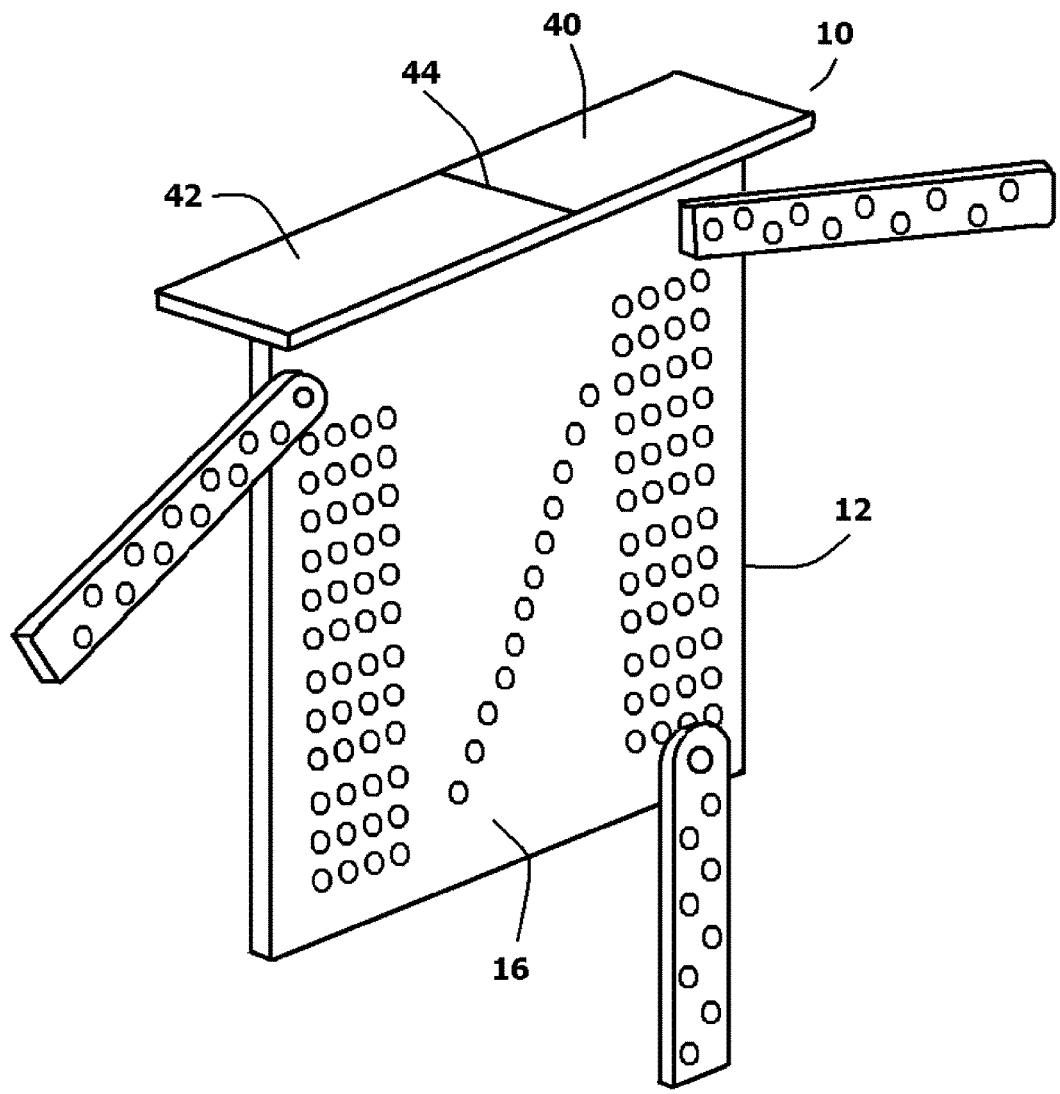
FIG. 2 is a rear perspective view of an exemplary embodiment of a jig assembly.
Figure 3:
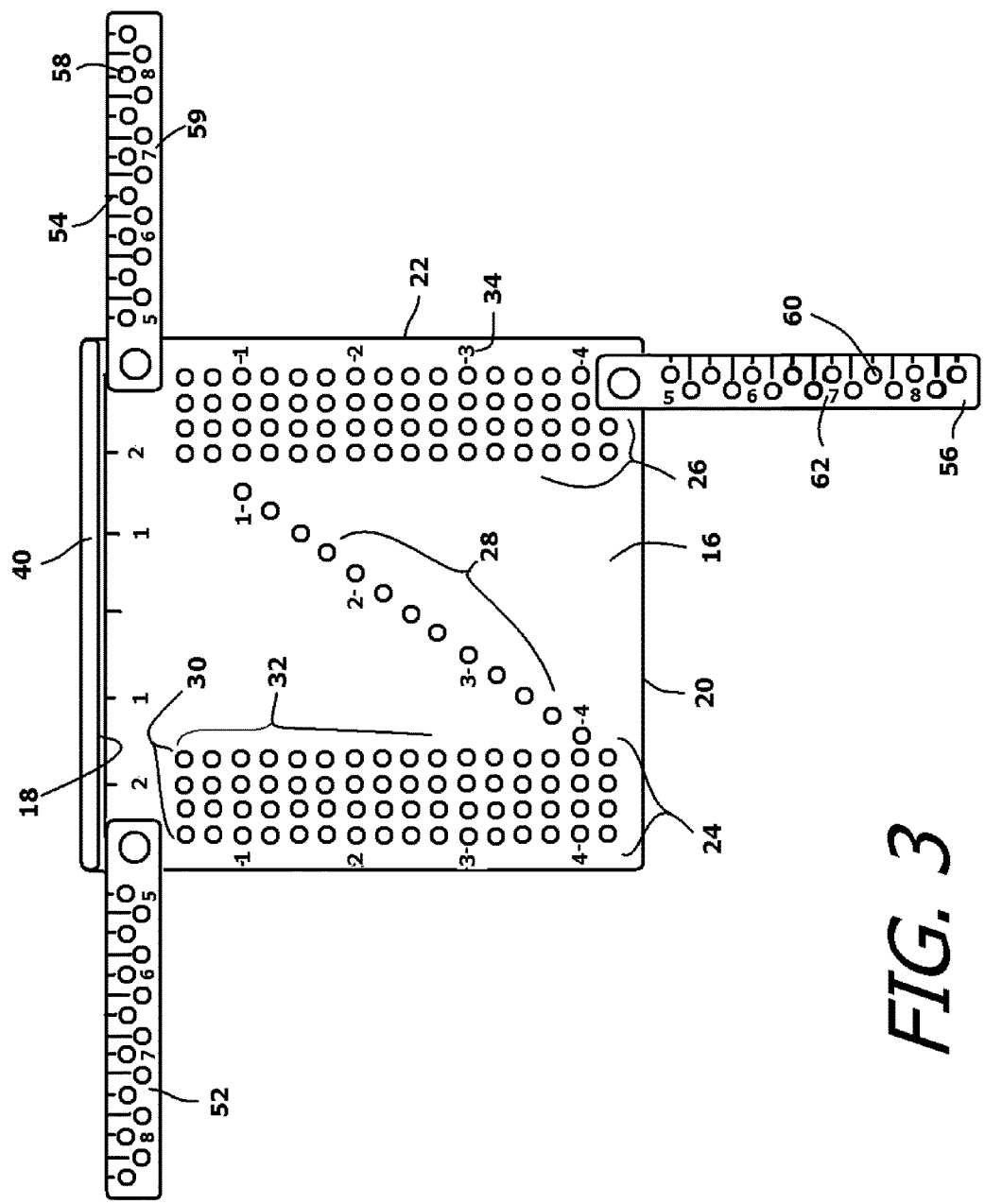
FIG. 3 is a rear view of the jig assembly.

Referring to FIG. 1 in conjunction with FIG. 2 and FIG. 3, a jig assembly 10 is shown. The jig assembly 10 includes a reference plate 12. The reference plate 12 has a flat face surface 14 and a flat rear surface 16. The flat face surface 14 and the flat rear surface 16 are defined between a common top edge 18, a common bottom edge 20 and two side edges 22.

A series of holes are formed in the reference plate 12. The holes extend through the reference plate 12 from the face surface 14 to the flat rear surface 16. The holes are arranged in a first matrix 24, a second matrix 26 and a diagonal grouping 28. In the first matrix 24, the holes are formed in parallel rows 30 and columns 32. The rows 30 are parallel with the top edge 18 of the reference plate 12. Each of the parallel rows 30 is a different distance from the top edge 18, wherein that distance comes in ¼ inch increments. As such, one parallel row 30 of holes is one inch from the top edge 18. The next subsequent row 30 of holes is 1¼ inches from the top edge 18, etc. The first row of parallel holes is preferably at least ½ inch from the top edge 18. The last row of parallel holes is at least three inches from the top edge 18. A first distance scale 34 is printed on the reference plate 12 to provide a visual indication as to the distance of the various rows 30 of holes from the top edge 18 of the reference plate 12.

Each parallel row 30 of holes contains between one and six holes. Each of the holes in any particular row 30 preferably have center points that are spaced either $\frac{1}{8}^{th}$ of an inch or $\frac{1}{4}^{th}$ of an inch apart. As such, each of the columns 32 in the first matrix 24 of holes is either $\frac{1}{8}^{th}$ or ¼ inch apart.

The second matrix 26 of holes is a mirror image of the first matrix 24 of holes. The rows 30 8-22 of holes in the second matrix 26 are horizontally aligned with the rows 30 of holes on the first matrix 24 of holes. The first matrix 24 of holes and the second matrix 26 of holes are preferably between two and 3.5 inches apart. A second distance scale 28 9-2 is provided so that a user can visualize how far apart the holes in the first matrix 24 are from the holes in the second matrix 26.

A top plate 40 is affixed to the reference plate 12. The top plate 40 extends in a plane that is perpendicular to the plane of the reference plate 12. The reference plate 12 intersects the center of the top plate 40. As such, the top plate 40 extends over both the flat face surface 14 and the flat rear surface 16 of the reference plate 12.

The top plate 40 has a top surface 42. A center indicia 44 is provided in the center of the top surface 42. The center indicia 44 can be a groove, slot, or just a printed line.

A side plate 46 is provided along one of the side edges 22 of the reference plate 12. The side plate 46 extends outwardly away from the flat face surface 14 of the reference plate 12. The side plate 46 terminates at the flat rear surface 16 of the reference plate 12. As such, on the flat rear surface 16 of the reference plate 12, the top plate 40 creates only one side wall. On the flat face surface 16 of the reference plate 12, the top plate 40 and the side plate 46 create two perpendicular walls that meet at a common corner 50. The purpose of the common corner 50 is later explained.

Arms are attached to the reference plate 12 at pivot connections. The arms include two upper arms 52 54 and one lower arm 56. The two top arms 52, 54 are connected to the reference plate 12 near the top plate 40. The two upper arms 52, 54 are symmetrically disposed, so that each upper arm 52, 54 is the mirror image of the other on the opposite side of the reference plate 12.

The upper arms 52, 54 each have a grouping of holes 58 that extend along the length of the upper arms 52, 54. Each upper arm 52, 54 also has scale indicia 59 so that the positions of the holes within each grouping of holes 58 can be visually identified.

The lower arm 56 is attached to the reference plate 12 near both the bottom edge 20 of the reference plate 12 and the side plate 46. The lower arm 56 contains a grouping of holes 60 that extend along the length of the lower arm 56. The lower arm 56 also has scale indicia 62 so that the position of the holes in the grouping of holes 60 along the lower arm 52 can be visually identified.

Figure 4:
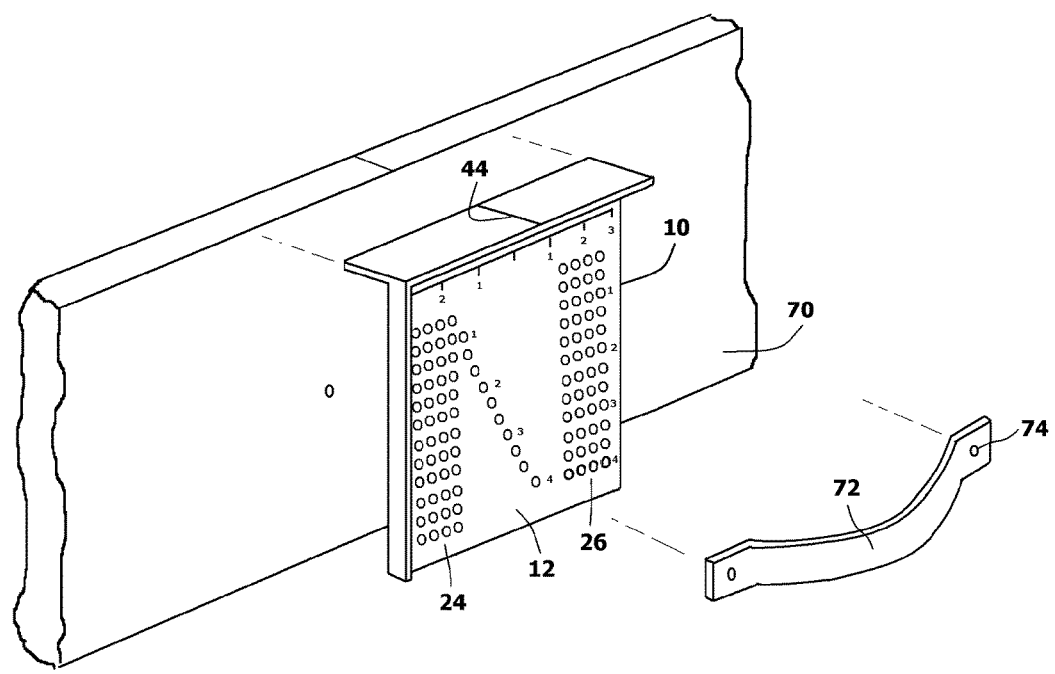
FIG. 4 shows the jig assembly in conjunction with a drawer front and a standard drawer pull.

Referring to FIG. 4 in conjunction with FIG. 2, it can be seen that the jig assembly 10 is being used to mark a drawer front 70 onto which is being installed a simple pull 72. The pull 72 has two mounting receptacles 74. The mounting receptacles 74 are typically between 2 and 3 inches apart, depending on the style and model of the pull 72.

To utilize the jig assembly 10, the middle of the drawer front 70 is measured and marked. The top plate 40 is then placed over the top edge 76 of the drawer front 70 so that the center indicia 44 on the top plate 40 align with the center of the drawer front 70. This creates a guide that suspends the reference plate 12 in front of the drawer front 70 in the center of the drawer front 70.

The user selects the desired elevation of the pull 72, which is often the center elevation of the drawer front 70. The user then simply presses a pencil or other marker through the holes in the first matrix 24 and the second matrix 26 that correspond to the selected elevation and the spread of the mounting receptacles 74. The upper arms 52, 54 and the lower arm 56 need not be extended for standard sized pulls. Pulls with a mounting receptacle spread of between 2.5 inches and 4 inches will correspond to existing holes in the first matrix 24 and the second matrix 26 on the reference plate 12. Once the proper marks are made, the jig assembly 10 is removed. The user can then drill into the drawer front 70 at the marks and install the pull 72.

Figure 5:
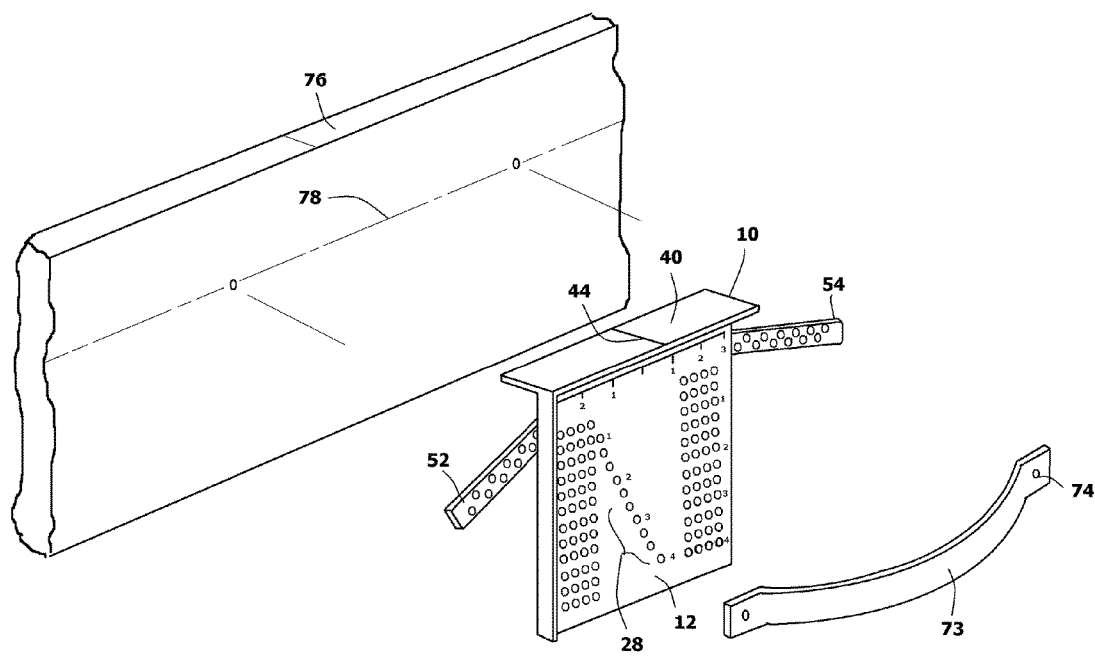
FIG. 5 shows the jig assembly in conjunction with a drawer front and an oversized drawer pull.

Referring to FIG. 5 in conjunction with FIG. 3, it can be seen that the jig assembly 10 is being used to mark a drawer front 70 onto which is being installed an oversized pull 73. The pull 73 has two mounting receptacles 74. The mounting receptacles 74 can be up to twelve inches apart, depending on the style and model of the oversized pull 73.

To utilize the jig assembly 10, the middle of the drawer front 70 is measured and marked. The top plate 40 of the jig assembly 10 is then placed over the top edge 76 of the drawer front 70. A desired elevation on the drawer front 70 at which to mount the oversized pull 72 is selected. A user then sets a pencil or other marker into a hole of the diagonal grouping 28 on the reference plate 12 that corresponds to that selected elevation. The user then runs the reference plate 12 across the length of the drawer front 70 to create an elevation line 78. As such, the jig assembly 10 is used in the same manner as a running gauge.

With the elevation line 78 marked, the jig assembly 10 is placed on the drawer front 70 so that the center indicia 44 on the top plate 40 of the jig assembly 10 aligns with the center of the drawer front 70. This suspends the reference plate 12 in front of the drawer front 70 in the center of the drawer front 70.

The spread of the mounting receptacles 74 on the oversized pull 73 is wider than the reference plate 12. As such, the user must rotate the upper arms 52, 54 to reach the spread distance. Prior to rotating the upper arms 52, 54, the user notes where the marked elevation line 78 intersects the upper arms 52, 54. Using the scale indicator 59 and the intersection point, a user can place a pencil or other marker in the proper hole on each of the upper arms 52, 54. The upper arms 52, 54 can then be rotated until the mark being made intersects the elevation line 78. This intersection shows the proper location to create the hole in the drawer front 70. For example, if the oversized pull 73 has mounting receptacles 74 that are spread by 7 inches and the pull 73 is to be mounted three inches below the top edge 76 of the drawer front 70, then an elevation line 78 is made along the 3 inch mark. The user notes on the scale indicia 59 where the 3 inch mark intersects each of the top arm 52, 54. The user then places a pencil in the hole noted as "7" on that scale indicia 59. The top arms 52, 54 are then rotated outwardly until they intersect the elevation line 78.

Figure 6:
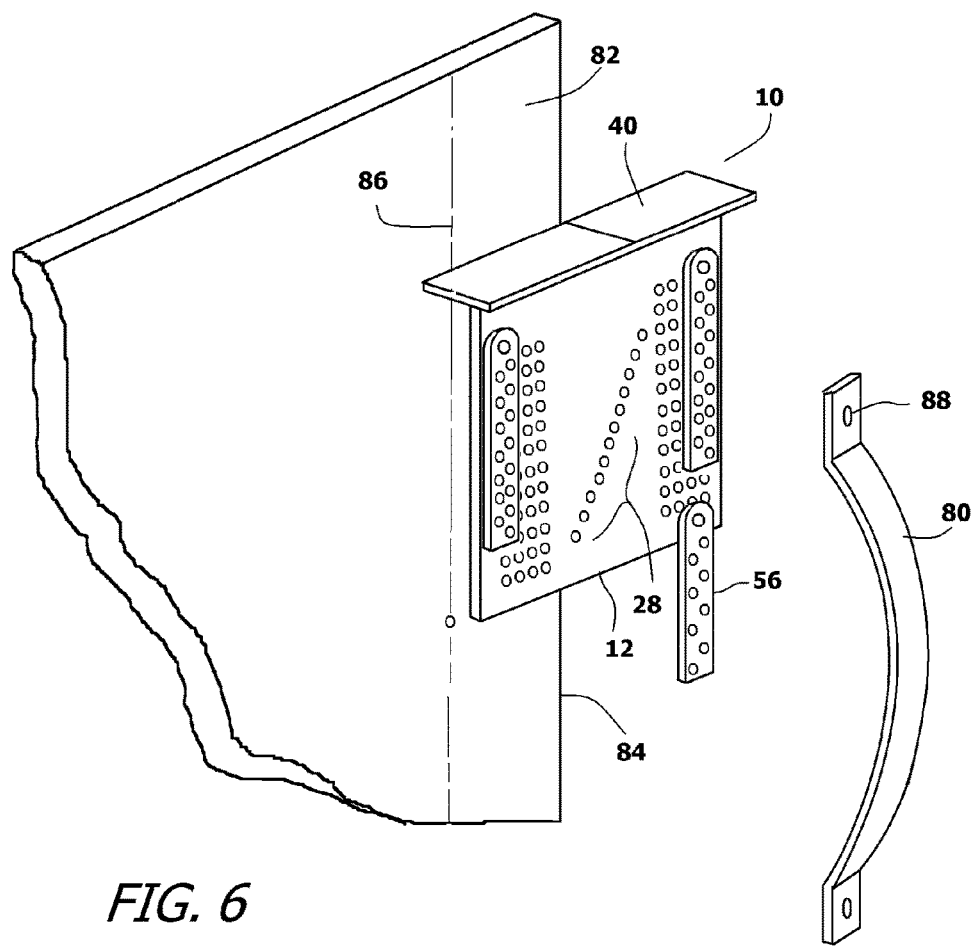
FIG. 6 shows the jig assembly in conjunction with a drawer front and a door handle.

Referring to FIG. 6 in conjunction with FIGS. 2 and 3, it will be understood that if a handle 80 is being installed on a door 82, the handle 80 is often not centered. Rather, the handle 80 is typically placed toward one corner of the cabinet door 82. To utilize the jig assembly 10 in this application, the top plate 40 of the jig assembly 10 is first placed over the long edge 84 of the door 82. A desired mounting depth for the handle 80 is selected. A user then sets a pencil or other marker into a hole of the diagonal grouping 28 on the reference plate 12 that corresponds to the selected depth. The user then runs the reference plate 12 along the door 82 to create a depth line 86. As such, the jig assembly 10 is used in the same manner as a running gauge.

When the depth line 86 is marked, the jig assembly 10 is oriented so that the corner 50 between the top plate 40 and the side plate 46 is placed over the corner of the door 82. As such, the side plate 46 and the top place 40 overlap perpendicular side edges of the door 82.

The spread of the mounting receptacles 88 on the handle 80 is longer than the reference plate 12. As such, the user must rotate the lower arm 56 to reach the spread distance. Prior to rotating the lower arm 56, the user notes where the marked depth line 86 intersects the lower arm 56. Using the scale indicator 62 and the intersection point, a user can place a pencil or other marker in the proper hole on the lower arm 56. The lower arm 56 can then be rotated until the mark being made intersects the depth line 86. This intersection shows the proper location to create the hole in the door 82.

It will be understood that the embodiment of the present invention that is illustrated and described is merely exemplary and that a person skilled in the art can make many variations to that embodiment. For instance, the reference plate and the arms can have many peripheral shapes. Likewise the various holes formed through the reference plate and arms can be formed in many patterns. All such embodiments are intended to be included within the scope of the present invention as defined by the claims.

What is claimed is:

1. A jig assembly for marking a cabinet with hole positions needed to install hardware, said jig assembly comprising:
   a reference plate having a face surface and an opposite rear surface that are defined, at least in part, by a top edge, a bottom edge and side edges;
   at least one matrix of holes formed through said reference plate;
   a first arm pivotably connected to said reference plate a first distance from said top edge, wherein a first plurality of holes are disposed through said first arm;
   a second arm pivotably connected to said reference plate at said first distance from said top edge, wherein a second plurality of holes are disposed through said second arm, and wherein said first arm and said second arm can rotate and extend away from said reference plate in opposite directions; and
   a top plate affixed to said top edge of said reference plate, wherein said top plate creates a guide along said top edge of said reference plate.

2. The assembly according to claim 1, wherein at least one matrix of holes formed through said reference plate includes a grouping of holes that includes holes at different distances from said top edge of said reference plate.

3. The assembly according to claim 2, further including a first set of scale indicia that provides visual reference for said different distances.

4. The assembly according to claim 1, wherein at least one matrix of holes formed through said reference plate includes both a first matrix of holes and a second matrix of holes, wherein said first matrix of holes and said second matrix of holes are arranged as mirror images of each other.

5. The assembly according to claim 4, wherein said first matrix of holes and said second matrix of holes each contain holes that are spaced apart by different distances.

6. The assembly according to claim 5, further including a distance scale on said reference plate for providing a visual reference to said different distances.

7. The assembly according to claim 1, further including scale indicia on said first arm to identify reference positions for each of said first plurality of holes.

8. The assembly according to claim 1, further including scale indicia on said second arm to identify reference positions for each of said second plurality of holes.

9. The assembly according to claim 1, further including a side plate affixed to one of said side edges of said reference plate, wherein said side plate creates a second guide along one of said side edges of said reference plate that intersects said top plate at a perpendicular to form a corner guide.

10. The assembly according to claim 1, wherein said guide created by said top plate extends both along said face surface of said reference plate and said rear surface of said reference plate at said top edge of said reference plate.

11. The assembly according to claim 1, wherein said side plate extends at a perpendicular from one of said side edges for said reference plate only extending out from said rear surface, wherein said side plate terminates flush with said face surface of said reference plate.

12. The assembly according to claim 1, further including a third arm that is pivotably connected to said reference plate, wherein said third arm rotates and extends beyond said bottom edge of said reference plate.

13. The assembly according to claim 12, further including a plurality of holes formed through said third arm.

14. A jig assembly for marking a cabinet with hole positions needed to install hardware, said jig assembly comprising:
   a reference plate having a first surface and an opposite second surface that extends between a top edge and two parallel side edges;
   at least one matrix of holes formed through said reference plate;
   two arms coupled to said reference plate with pivot connections, wherein said two arms rotate out beyond said parallel side edges, and wherein each of said arms contains a plurality of holes extending therethrough; and
   a guide that extends between said side edges, wherein said guide protrudes outwardly from said reference plate at a perpendicular.

15. The assembly according to claim 14, wherein at least one matrix of holes formed through said reference plate includes a grouping of holes that includes holes at different distances from said top edge of said reference plate.

16. The assembly according to claim 15, further including a first set of scale indicia that provides visual reference for said different distances.

17. The assembly according to claim 15, further including scale indicia on said arms to identify reference positions for each of said plurality of holes.

18. The assembly according to claim 14, further including a side plate affixed to said reference plate, wherein said side plate creates a second guide that intersects said guide at a perpendicular to form a corner.

19. The assembly according to claim 14, further including a third arm that is pivotably connected to said reference plate, wherein said third arm rotates and extends beyond said reference plate.

* * * * *